United States Patent [19]

Gray

[11] 4,402,049

[45] Aug. 30, 1983

[54] HYBRID VELOCITY DERIVED HEADING REFERENCE SYSTEM

[75] Inventor: Jack Gray, Bricktown, N.J.

[73] Assignee: The United States of America as represented by the Secretary of the Army, Washington, D.C.

[21] Appl. No.: 246,518

[22] Filed: Mar. 23, 1981

[51] Int. Cl.³ .................... G06F 15/50; G06G 7/78
[52] U.S. Cl. ............................ 364/447; 364/453; 364/455; 364/456; 364/457
[58] Field of Search ............. 364/447, 450, 453, 455, 364/456, 457; 343/8, 9 R, 100 ST, 112 C, 112 S, 113 DE

[56] References Cited

U.S. PATENT DOCUMENTS

| 3,214,575 | 10/1965 | Seliger et al. | 364/447 X |
| 4,106,094 | 8/1978 | Land | 364/453 |
| 4,232,313 | 11/1980 | Fleishman | 364/453 X |

*Primary Examiner*—Jerry Smith
*Attorney, Agent, or Firm*—Robert P. Gibson; Jeremiah G. Murray; Edward Goldberg

[57] ABSTRACT

An accurate and constantly updated heading reference is provided for moveable vehicles, particularly aircraft. The heading is calculated from four velocity measurements, two of which are obtained from signals received from orbiting satellites, and two from on-board equipment which determines the vehicle's along-track and cross-track velocities. The on-board equipment may be a Doppler ground-speed sensor or an inertial velocity sensor using accelerometers, the outputs of which are integrated.

11 Claims, 10 Drawing Figures

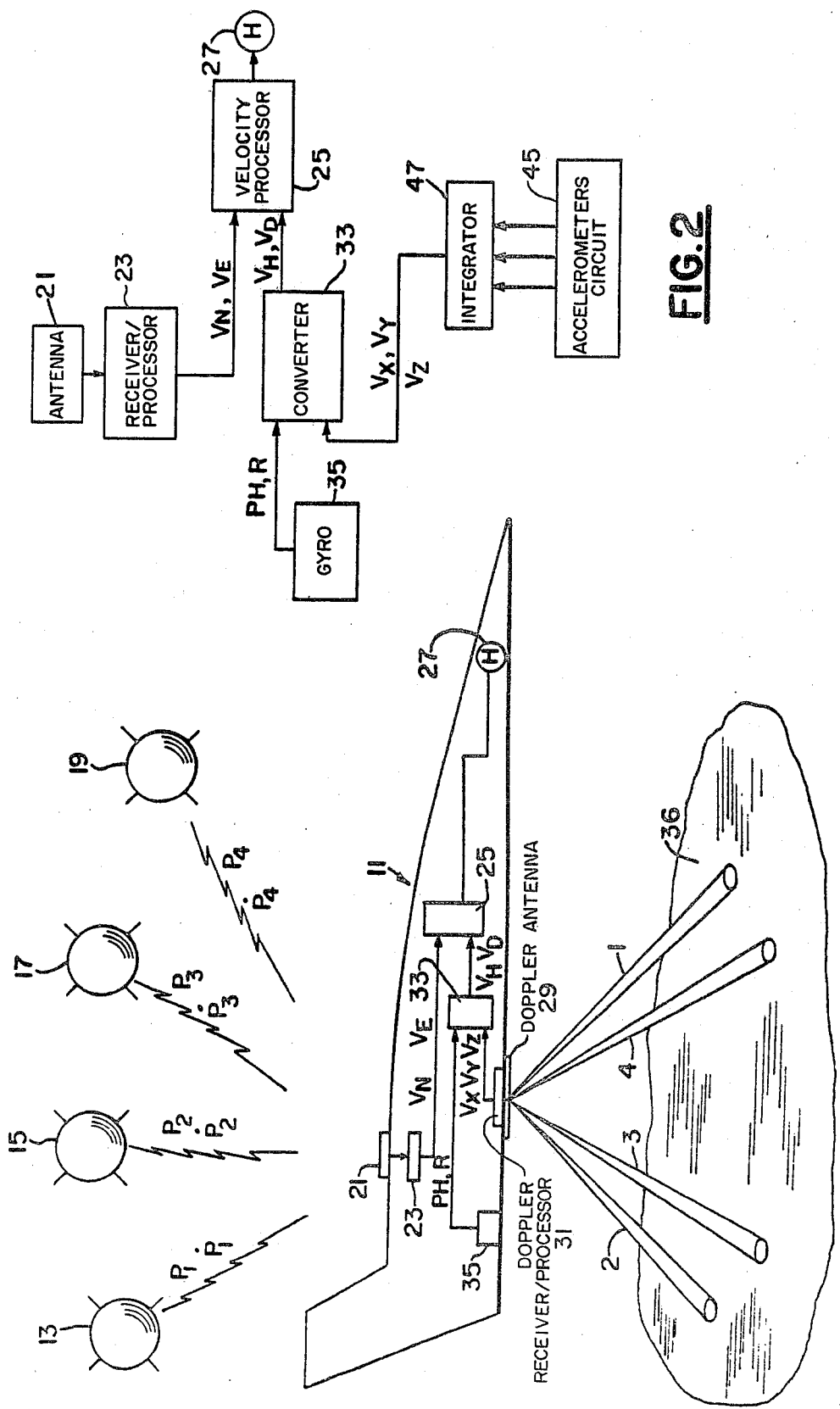

HYBRID VELOCITY DERIVED HEADING REFERENCE SYSTEM

The invention described herein may be manufactured and used by or for the U.S. Government for governmental purposes without the payment of any royalties therefor or thereon.

BACKGROUND OF THE INVENTION

This invention relates to the field of navigation, and more particularly to a device and method which can be used in any type of moveable vehicle, be it aircraft, land vehicle or marine vessel, to provide a dependable and accurate true heading reference. That is, the present invention provides an accurate and constantly updated readout of the vehicles present direction of travel relative to the earth's latitude and longitude coordinate system.

The simplest type of heading reference is a magnetic compass, however this device does not yield true heading but magnetic heading and in order to convert this to true heading, the local magnetic variation must be known and this can be determined only if the vehicle's position on the earth is known. Also, magnetic compasses are subject to many errors, e.g., deviation caused by magnetic materials on board the vehicle, or even iron ore deposits in the earth below the vehicle. Also, magnetic compasses suffer from acceleration and turning errors. Further, since they sense and respond to the horizontal component of the earth's field, their sensitivity decreases at locations near the earth's magnetic poles where the horizontal component becomes small or nonexistent. Also, the earth's magnetic poles are constantly shifting. Further, after a magnetic compass has been perturbed by acceleration, it will continue to oscillate for a time after the acceleration ceases.

The present invention provides a true heading reference or compass in which the heading is calculated from vehicle velocity measurements obtained from a Global Positioning System (GPS) receiver and other velocity measurements obtained either from a self contained Doppler velocity measuring system, or from vehicle-mounted accelerometers, the outputs of which are integrated to obtain along-track and cross-track velocities. Thus an accurate true heading is obtained by calculation utilizing information obtained from a satellite navigation system, the GPS; and from self contained on board velocity measuring equipment. The results are therefore completely independent of the earth's magnetic field and the errors which can be caused thereby, and it provides accurate heading information anywhere on earth. An accurate heading reference is particularly important for vehicles operating in arctic and antarctic regions where the earth's field is not reliable.

SUMMARY OF THE INVENTION

The invention is primarily intended for use with aircraft and will be illustrated in connection therewith, however, as stated above, it can be used with any type of moveable vehicle which requires an accurate heading reference. An antenna is mounted atop the vehicle for receiving signals from a number of orbiting satellites comprising part of the NAVSTAR Global Positioning System (GPS). The GPS receiver connected to the GPS antenna processes signals from four of these satellites and yields the range of each satellite and the rate change of range thereto. The GPS receiver then correlates these range and range rate signals with the known orbital data or ephemeris of the four satellites to obtain north velocity, $V_n$, and east velocity, $V_e$. These velocities are true, that is, $V_n$ is the velocity along the local meridian and $V_e$ is the velocity along the local parallel of latitude.

The Doppler velocity measuring system includes a Doppler antenna array, similar to those used with Doppler navigators, mounted on the underside of the vehicle. This array radiates four microwave beams, two in the forward direction and two toward the aft. The array also picks up the echo signals backscattered from the earth's surface. These signals are converted by well-known Doppler techniques to the three axial velocities of the vehicle, $V_x$, $V_y$, and $V_z$. These three velocities are those along the roll axis, the pitch axis, and the yaw axis, respectively. By correlating these three axial velocities with the instantaneous pitch and roll angles of the vehicle obtained from a vertical gyro, the along-track velocity, $V_h$, and cross-track or drift velocity, $V_d$, of the vehicle are obtained.

The two GPS derived velocities and the two Doppler system derived velocities are then used to calculate, by means of a simple algorithm or formula and circuitry, the vehicle's true heading.

Instead of using Doppler radar equipment to obtain the three vehicle axial velocities, strapped-down accelerometers may be used to measure vehicle acceleration along the three orthogonal axes, and their outputs integrated to obtain the axial velocities. These velocities would then be used in correlation with the pitch and roll angles to generate $V_h$ and $V_d$ used in calculating the true heading.

The true heading is displayed on the vehicle's panel for the benefit of the crew and it can also be used as an accurate and constantly updated heading reference supplied to a Doppler navigator which may form part of the vehicle's equipment. The inaccuracy accuracy and cumulative error of the heading reference of state of the art Doppler navigators is the major source of error in these devices. Also, the Doppler equipment used to obtain the velocities $V_h$ and $V_d$ can be part of a Doppler navigator, thus avoiding duplication of such things as the Doppler antenna array, the microwave transmitter, and the vertical gyro from which the pitch and roll information is obtained.

It is thus an object of the invention to provide a novel and accurate true heading reference for vehicles which utilize navigation satellite-derived velocities and other velocities derived from on-board equipment.

This and other objects and advantages of the invention will become apparent from the following detailed description and the drawings.

BRIEF DESCRIPTION OF THE DRAWINGS

FIG. 1 is a pictorial-block diagram illustrating the invention with satellite and Doppler velocity measuring equipment.

FIG. 2 shows how the circuitry of FIG. 1 would be modified to permit use with accelerometers for determining $V_h$ and $V_d$.

DETAILED DESCRIPTION OF A PREFERRED EMBODIMENT

Figure 5:
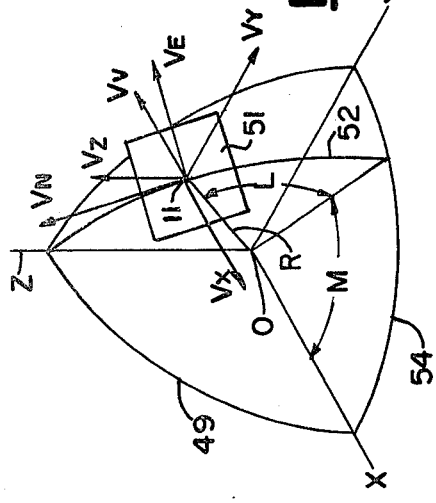
FIGS. 4 and 5 illustrate how the GPS derived velocities are obtained and transformed from one coordinate system to another.

The GPS system, officially designated as NAV-STAR GPS, is a satellite referenced radio navigation system consisting of 24 satellites orbiting in three different planes and spaced along their orbits such that four or more satellites are visible at all times at any place on earth. A ground tracking network periodically measures and updates the ephemeris of each satellite and keeps all satellite clocks synchronized. Each satellite continually transmits orthogonally binary coded ranging signals to users. By using a code correlation detector, the GPS user can measure the time delay of the transmitted signal. This time delay not only includes the signal propagation delay but also the clock bias and clock bias rate differences between the user's clock and the satellite clocks. The GPS user equipment comprising an antenna and a receiver/processor connected thereto, can be used to determine user position and velocity by measuring the GPS signal time of arrival together with GPS signal Doppler shift. This is done by receiving all available satellite signals from which four satellites are selected to establish four independent pseudo range and pseudo range rates. Since the user's clock bias, or error, is common to all range measurements, it induces a time error into these measurements which is directly related to the range error by a constant factor, namely the speed of light. Therefore, the clock bias, which is actually a phase difference using quartz clocks, can be treated as a bias error source in the range measurement. Thus the initially measured range is referred to as a pseudo range rather than a true range. The pseudo range measurement, $P_i$, is a scaler quantity equal to the biased magnitude of the vector difference between the user's position and the satellite position. In the absence of clock error, only three range and range rate measurements would be necessary to completely specify the user's position and velocity, given the satellites' positional information or ephemeris, however by measuring four so called pseudo ranges and pseudo range rates, the unknown user clock bias or error can be determined as well as the position and velocity, since four equations are available for simultaneous solution. Exactly how the desired information is processed to obtain the required velocity measurement will be explained below.

In FIG. 1 a vehicle 11, which is illustrated as an aircraft, includes a GPS receiving antenna 21 mounted atop its fuselage where it will have unobstructed view of GPS satellites 13, 15, 17, and 19 passing overhead. The received GPS signals are applied to GPS receiver/processor 23 where the north velocity $V_n$, and the east velocity $V_e$, are derived therefrom, in a manner to be explained. The aircraft also includes on its underside a Doppler antenna array 29 adapted to radiate four beams of microwave energy, 1, 2, 3, and 4, toward the earth 36, and receive backscattered energy therefrom. The Doppler receiver/processor 31 receives the backscattered echo signals, correlates them with a sample of the transmitted signal to obtain Doppler signals indicative of the vehicle velocity along its three orthogonal axes, $V_x$, $V_y$, and $V_z$. As shown, these axial velocities are applied to converter unit 33 together with instantaneous pitch and roll signals obtained from vertical gyro 35. The way in which converter 33 calculates the along-track velocity, $V_h$, parallel to the earth's surface, and the cross-track velocity, $V_d$, also parallel to the earth, will also be explained in detail below.

Figure 3:
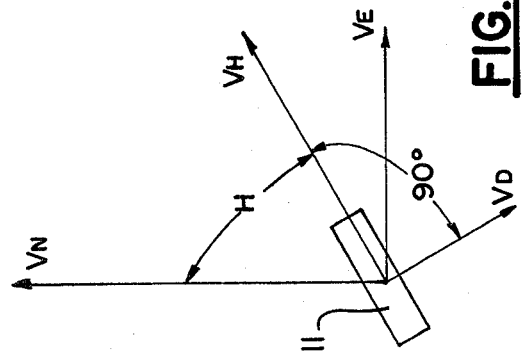
FIG. 3 is a vector diagram illustrating how the true heading is obtained from the measured velocities.

The four velocities $V_n$, $V_e$, $V_h$ and $V_d$ are applied to velocity processor 25, which calculates the true heading, H, therefrom. The principle on which the velocity processor operates can be seen from the diagram of FIG. 3, which shows the vehicle 11 at the center of a coordinate system comprising two orthogonal axes in an imaginary plane tangent to the earth at the instantaneous position of the vehicle. Thus $V_n$ would be tangent to the local meridian and $V_e$ to the local parallel of latitude, with $V_h$ and $V_d$ in the same plane. The heading angle H is that between $V_n$ and $V_h$, as shown. Since the north velocity must be equal to the northerly component of the vector sum of $V_h$ and $V_d$, the following equation can be written, $$V_n = V_h \cos H - V_d \sin H \qquad \text{Eq. (1)}$$

Also, the east velocity, $V_e$, must be equal to the easterly component of the vector sum of $V_h$ and $V_d$, thus, $$V_e = V_d \cos H + V_h \sin H \qquad \text{Eq. (2)}$$

Solving for cos H and sin H yields;

$$\cos H = \frac{V_n V_h + V_d V_e}{V_h^2 + V_d^2} \text{ and,} \qquad \text{Eq. (3)}$$

$$\sin H = \frac{V_h V_e - V_n V_d}{V_h^2 + V_d^2} \qquad \text{Eq. (4)}$$

Therefore, $$\text{Heading, } H = \text{Arctan}\left[\frac{V_h V_e - V_n V_d}{V_n V_h + V_d V_e}\right] \qquad \text{Eq. (5)}$$

It is apparent that given this simple algorithm and all of the velocity values therein, it is a simple matter to determine the true heading, H, of the vehicle, and this is done by velocity processor 25.

Figure 4:
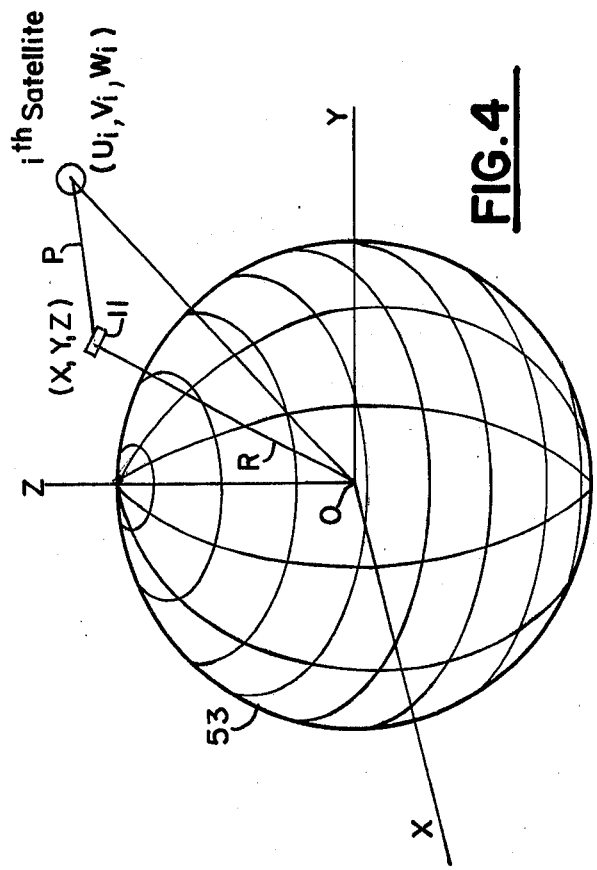
Figure 7:
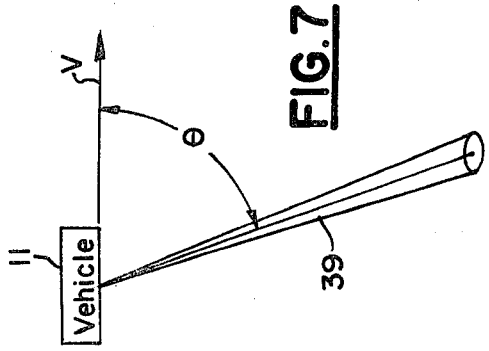
FIGS. 6–10 are useful in understanding how the on-board equipment obtains the velocities $V_h$ and $V_d$.

The global diagram of FIG. 4 illustrates how the GPS receiver circuitry calculates the GPS velocities. The diagram is Cartesian Earth-centered reference (ECR) coordinate system with the origin, O, of the mutually orthogonal X, Y and Z axes at the center of the earth. The vehicle 11 with the present invention aboard is shown at coordinates, X, Y and Z, with the $i^{th}$ satellite at coordinates $U_i$, $V_i$ and $W_i$. The letter R represents the radius of the earth which passes through the vehicle 11 and P the range of the $i^{th}$ satellite.

The position fixing equation for the vehicle 11 is:

$$\sum_{i=1}^{4} (P_i + B)^2 = (U_i - X)^2 + (V_i - Y)^2 + (W_i - Z)^2 \qquad \text{Eq. (6)}$$

wherein; $P_i$ equals the measured pseudo range, B is the satellite to user clock bias. Four equations of this sort can be written and solved for the four unknowns, namely the vehicle position X, Y and Z and the clock bias B. This vehicle position information is then used in the next set of calculations to derive the range rate information or relative velocities of the vehicle and each of the four satellites. As in the positioning problem, a bias exists between the user and satellite clocks affecting range rate measurements. Doppler information is extracted from detected signal frequencies to yield range rate data. A frequency bias (or clock bias rate) in the user's clock, relative to the satellite clock frequencies, adds an error to the measurements, such that a pseudo range rate is actually measured. This pseudo range rate, also a scaler quantity, is the biased magnitude of the vector difference, along the line of sight, between the user's velocity and the satellite velocity. The GPS velocity fixing equations are:

$$\sum_{i=1}^{4} \dot{P}_i + \dot{B} = \qquad \text{Eq. (7)}$$

$$\frac{(X - U_i)(\dot{X} - \dot{U}_i) + (Y - V_i)(\dot{Y} - \dot{V}_i) + (Z - W_i)(\dot{Z} - \dot{W}_i)}{RHO_i}$$

wherein, $\dot{X}$, $\dot{Y}$ and $\dot{Z}$ are the vehicle velocities, $\dot{P}_i$ is the measured pseudo range rate and $\dot{U}$, $\dot{V}$ and $\dot{W}$, are the satellite velocities along the three coordinate axes, obtained from the orbital data stored in memory, B is the satellite to user clock bias rate or frequency bias, and, $$\sum_{i=1}^{4} RHO_i = [(X - U_i)^2 + (Y - V_i)^2 + (Z - W_i)^2]^{\frac{1}{2}} \qquad \text{Eq. (8)}$$

Thus $RHO_i$ is the positional information obtained in the preceding step. Four simultaneous equations like Eq. (7) can be written for each of the four satellites and can be solved to yield all four unknowns. The results are the vehicle velocities along the X, Y and Z axes of FIG. 4.

In order to derive the required $V_n$ and $V_e$ velocities it is necessary to transfer to a spherical coordinate system since the earth's latitude and longitude system is based thereon. FIG. 5 illustrates how this transformation is made. In FIG. 5, 49 represents a sector of the earth, with R the earth's radius and the X, Y and Z coordinate system of FIG. 4 drawn thereon. Point O indicates the earth's center and the plane 51 represents a plane tangent to the earth at the location of the vehicle 11. The local meridian 52 is shown. The angle of lattitude L of the vehicle is the angle which radius R makes with the equator 54, measured along the local meridian 52. The angle M between the X axis and the local meridian is the longitude. The previously derived velocities $V_x$, $V_y$ and $V_z$ are shown, together with the required transformation thereof, $V_n$ and $V_e$. $V_v$ is the radial component of velocity along an extension of the earth's radius R. The vehicle velocities, $V_x$, $V_y$ and $V_z$ are the same velocities indicated by the symbols $\dot{X}$, $\dot{Y}$ and $\dot{Z}$ in Eq. (7).

$$\dot{X} = V_x = -V_n \sin L \cos M + V_v \cos L \cos M - V_e \sin M \qquad \text{Eq. (9)}$$

$$\dot{Y} = V_y = V_v \cos L \sin M + V_e \cos M - V_n \sin L \sin M \qquad \text{Eq. (10)}$$

$$\dot{Z} = V_z = V_v \sin L + V_n \cos L \qquad \text{Eq. (11)}$$

wherein, L=Arcsin Z/R=Latitude, M=Arccos X/RcosL=Longitude, and $R=(X^2+Y^2+Z^2)^{.5}$.

The solution of these simultaneous equations will give the user his $V_n$, $V_v$ and $V_e$ velocities. The velocity of rotation of the earth at the local latitude must be subtracted from the $V_e$ to obtain the easterly velocity relative to the earth's surface.

All of these mathematical operations are automatically performed by the circuitry designated GPS receiver/processor (23) using information stored therein in memory as well as other information received from the satellites.

The way in which the Doppler sensor derived velocities are measured can be understood with reference to FIGS. 6-10. For a vehicle such as 11 of FIG. 7 moving parallel to the earth with a velocity V, the Doppler frequency varies as the cosine of the angle $\theta$ between the beam center and the direction of motion, as well as with the transmitted wavelength and the vehicle's ground speed. Thus, $$F_d = \frac{2Vf\cos\theta}{c} \qquad \text{Eq. (12)}$$

wherein $F_d$ is the frequency shift, V is the ground speed, c the speed of light and f the transmission frequency.

Figure 8:
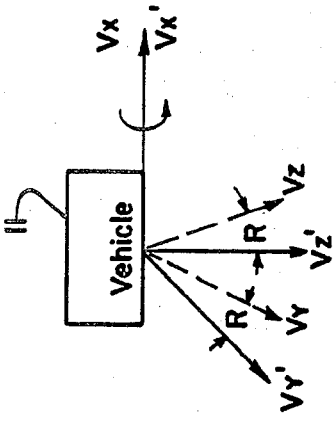
Figure 6:
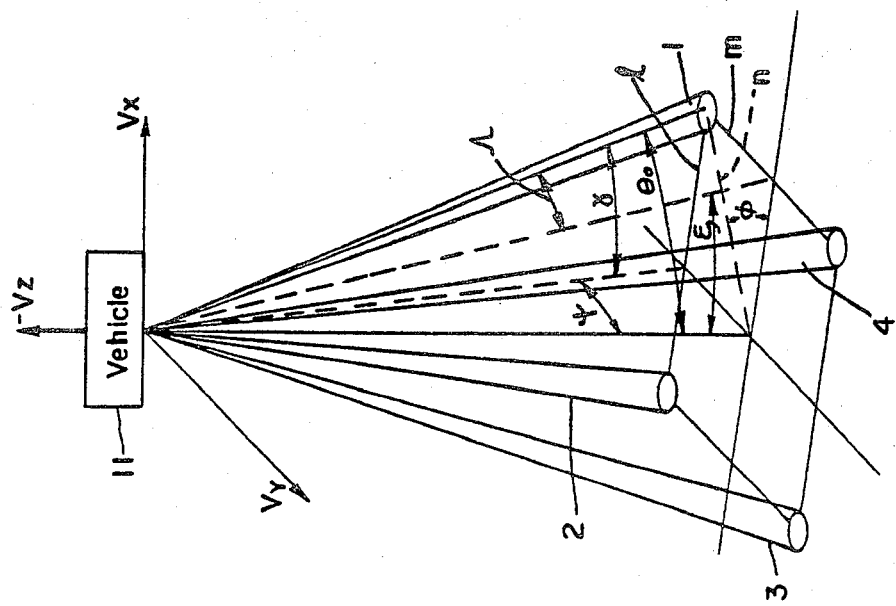

FIG. 8 illustrates the coordinate system used to explain and process the Doppler information. The vehicle 11 therein is shown flying straight and level, that is, the effects of pitch, roll and yaw will be ignored for the moment. $V_x$, $V_y$ and $V_z$ are the vehicle velocities along the roll, pitch and yaw axes, respectively. The angle $\theta$ is the same as that discussed in connection with FIG. 7. $V_h$ is the along-track or heading velocity and $V_d$ the cross-track or drift velocity. $A_1$ is the angle of the Doppler beam with respect to the heading axis and $A_2$ the angle of the Doppler beam to the drift axis and $A_3$ the angle of the beam with respect to the vertical axis. The Doppler system of the present invention utilizes four beams as illustrated in FIGS. 1 and 6. To simplify the presentation and calculation of the desired velocities, a set of direction cosines related to the angles depicted on FIG. 6 are utilized. These direction cosines are as follows:

$l = \sin\gamma = \cos\phi \cdot \sin\theta_o = \cos A \sin\xi$; $m = \cos\gamma \sin\psi = \sin\phi \cdot \sin\theta = \sin A$; and $n = \cos\gamma \cos\psi = \cos\theta_o = \cos A \cos\xi$. There are four sets of these direction cosines, one for each of the four beams 1-4, with subscripts corresponding to the beam number. Thus, the extended form of Eq. (12), using the coordinate system of FIG. 8, is as follows, $$F_d = [2V_x \cos A_1 \cdot f/c] + 2V_y \cos A_2 \cdot f/c] + [2V_z \cos A_3 \cdot f/c] \qquad \text{Eq. (13)}$$

wherein; $V_x = V_h$, $V_y = V_d$, and $-V_z = V_v$, since vehicle pitch, roll and yaw are being temporarily ignored.

To obtain the velocities of interest, namely $V_x$, $V_y$, and $V_z$, the direction cosines are used. Using Eq. (13) and solving for the Doppler frequencies of each of the four beams 1-4, yields, $$F_{d1} = 2f/c[l_1 V_x - m_1 V_y + n_1 V_z] \qquad \text{Eq. (14)}$$

$$F_{d2} = 2f/c[-l_2 V_x - m_2 V_y + n_2 V_z] \qquad \text{Eq. (15)}$$

$$F_{d3} = 2f/c[-l_3 V_x + m_3 V_y + n_3 V_z] \qquad \text{Eq. (16)}$$

$$F_{d4} = 2f/c[l_4 V_x + m_4 V_y + n_4 V_z] \qquad \text{Eq. (17)}$$

Since the beams are symmetrical, the direction cosines for all the beams are the same, except for sign, that is, $|l_1| = |l_2| = |l_3| = |l_4|$, $|n_1| = |n_2|$, etc.

Rearranging Equations 14-17, the Doppler velocities $V_x$, $V_y$, and $V_z$ are obtained, as follows, $$V_x = f/8cl[F_{d1} - F_{d2} - F_{d3} + F_{d4}] \qquad \text{Eq. (18)}$$

$$V_x = f/8cl[-F_{d1} - F_{d2} + F_{d3} + F_{d4}] \qquad \text{Eq. (19)}$$

$$V_z = f/8cl[F_{d1} + F_{d2} + F_{d3} + F_{d4}] \quad \text{Eq. (20)}$$

Figure 9:
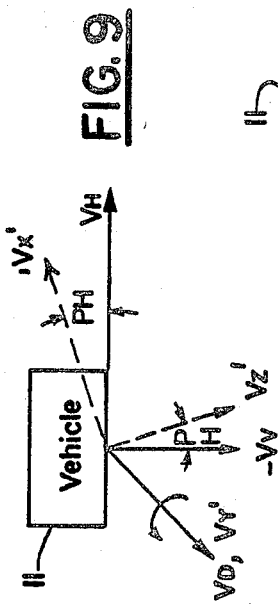

The required Doppler derived velocities $V_h$ and $V_d$ are those in a plane parallel to the earth, thus the three velocities given by equations 18–20 must be modified in accordance with the pitching and rolling motions of the vehicle to obtain $V_h$ and $V_d$. If for example the vehicle experiences a change of pitch, there will be a rotation of the vehicle about the $V_d$ or pitch axis, as shown in FIG. 9, and the components of the velocities in the aforementioned plane parallel to the earth can be obtained from the following matrix, wherein PH is the pitch angle, $$\begin{bmatrix} V_h \\ V_d \\ -V_v \end{bmatrix} = \begin{bmatrix} \cos PH & 0 & \sin PH \\ 0 & 1 & 0 \\ -\sin PH & 0 & \cos PH \end{bmatrix} \cdot \begin{bmatrix} V_x \\ V_y \\ V_z \end{bmatrix} \quad \text{Eq. (21)}$$

Figure 10:
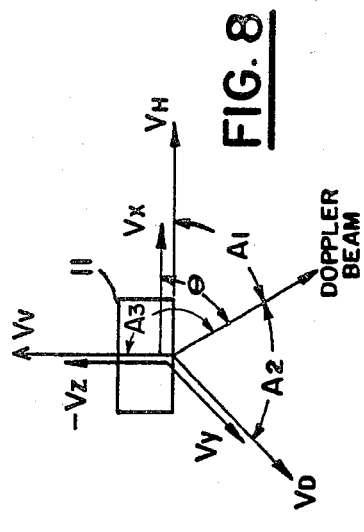

Rolling motion of the vehicle, as shown in FIG. 10, results in rotation about the X axis and is described by the following matrix, wherein R is the angle of roll, $$\begin{bmatrix} V_x \\ V_y \\ V_z \end{bmatrix} = \begin{bmatrix} 1 & 0 & 0 \\ 0 & \cos R & -\sin R \\ 0 & \sin R & \cos R \end{bmatrix} \cdot \begin{bmatrix} V_x \\ V_y \\ V_z \end{bmatrix} \quad \text{Eq. (22)}$$

Combining these two matrices for pitch and roll changes results in the following matrix, $$\begin{bmatrix} V_h \\ V_d \\ -V_v \end{bmatrix} = \begin{bmatrix} \cos PH & \sin PH \sin R & \sin PH \cos R \\ 0 & \cos R & -\sin R \\ -\sin PH & \cos PH \sin R & \cos PH \sin R \end{bmatrix} \cdot \begin{bmatrix} V_x \\ V_y \\ V_z \end{bmatrix} \quad \text{Eq. (23)}$$

As stated above, the vertical gyro 35 provides the pitch and roll information to the converter unit 33 to enable it to perform the above operations on the Doppler velocities $V_x$, $V_y$, and $V_z$, to yield $V_h$ and $V_d$ which are required for input to velocity processor 25.

FIG. 2 shows what the vehicle mounted circuitry would be for the aforementioned modification in which strapdown accelerometers are used to obtain the vehicle velocities instead of a Doppler sensor system as shown in FIG. 1. In FIG. 2, three accelerometers in circuit 45 are attached to the vehicle 11 in such a way that they sense mutually orthogonal accelerations along the pitch, roll and yaw (or X, Y, and Z) axes of the vehicle. The outputs of these three accelerometers are applied to integrator 47 which performs a mathematical integration on these signals to yield the three axial velocities, $V_x$, $V_y$, and $V_z$, just as does the Doppler sensor circuitry of FIG. 1. The remainder of the circuitry of FIG. 2 is the same as that of FIG. 1, and operates in the same manner to yield the true heading reference.

While the invention has been described in connection with illustrative embodiments, obvious variations thereof will occur to those skilled in the art, accordingly the invention should be limited only by the scope of the appended claims.

I claim:

1. A vehicle navigation system including a true heading reference system for determining and controlling the position and velocity of a moveable vehicle, comprising: a receiver/processor on said vehicle for receiving range and range rate signals from a plurality of orbiting navigational satellites and processing said signals together with the stored ephemeris information of said satellites to provide a signal representative of the vehicle's velocity with respect to the earth along the local meridian $V_n$, and its velocity along the local parallel of latitude, $V_e$, said system further comprising sensing apparatus on said vehicle for measuring and providing signals representing the vehicle's axial velocities, $V_x$, $V_y$ and $V_z$ along the roll, pitch and yaw axes thereof, a vertical gyro adapted to provide instantaneous pitch and roll signals for said vehicle, a converter unit to which said axial velocity signals and said pitch and roll signals are fed to obtain signals representing the along-track velocity, $V_h$, and the cross-track velocity, $V_d$, of said vehicle, a velocity signal processor to which the four said velocity signals $V_h$, $V_d$, $V_n$, and $V_e$ are fed, said velocity signal processor providing an output signal representative of the true heading of said vehicle from the vector relationship of said four velocity signals, and apparatus connected to said velocity signal processor for utilizing said output signal for the navigation of said vehicle.

2. The system of claim 1 wherein said receiver/processor receives four pseudo range and pseudo range rate signals from four different satellites.

3. The system of claim 1 wherein said sensing apparatus for measuring the axial velocities comprises a Doppler sensor adapted to measure the ground speed of said vehicle by radiating one or more microwave beams toward the earth and receiving Doppler-shifted echo signals from the earth.

4. The system of claim 1 wherein said sensing apparatus for measuring axial velocities comprises three strapped down accelerometers mounted on said vehicle in such a way as to measure the vehicle acceleration along its three mutually orthogonal axes, and integrators connected to all of said accelerometers for obtaining the said axial velocities, $V_x$, $V_y$, and $V_z$.

5. The system of claim 1 wherein said apparatus for utilizing said output signal includes a display device.

6. The system of claim 1 wherein said apparatus for utilizing said output signal includes a Doppler navigator.

7. A hybrid heading reference system for use in navigating a vehicle, comprising: receiving and processing apparatus on said vehicle adapted to receive signals from a plurality of remote orbiting navigational satellites and to derive from said signals and from stored ephemeris information regarding the orbits of said satellites signals representative of the velocities with respect to the earth of said vehicle along the local meridian and along the local parallel of latitude; sensing apparatus on said vehicle for measuring signals representative of the along-track and cross-track velocities of said vehicle, a velocity signal processor on said vehicle for processing the four said velocity signals to provide an output signal representative of the true heading of said vehicle, and apparatus connected to said velocity signal processor for utilizing said output signal for the navigation of said vehicle.

8. The system of claim 7 wherein said sensing apparatus on said vehicle for measuring signals includes a Doppler sensor.

9. The system of claim 7 wherein said sensing apparatus on said vehicle for measuring signals includes three strapped down accelerometers for measuring acceleration along the pitch, roll and yaw axes of said vehicle, and integrators connected to each of said accelerometers for obtaining velocities along said three axes.

10. The system of claim 7 wherein said apparatus for utilizing said output signal includes a display device.

11. The system of claim 7 wherein said apparatus for utilizing said output signal includes a Doppler navigator.

* * * * *